No. 766,297. PATENTED AUG. 2, 1904.
A. TURKINGTON.
WHEEL FOR VEHICLES.
APPLICATION FILED DEC. 3, 1903.
NO MODEL.
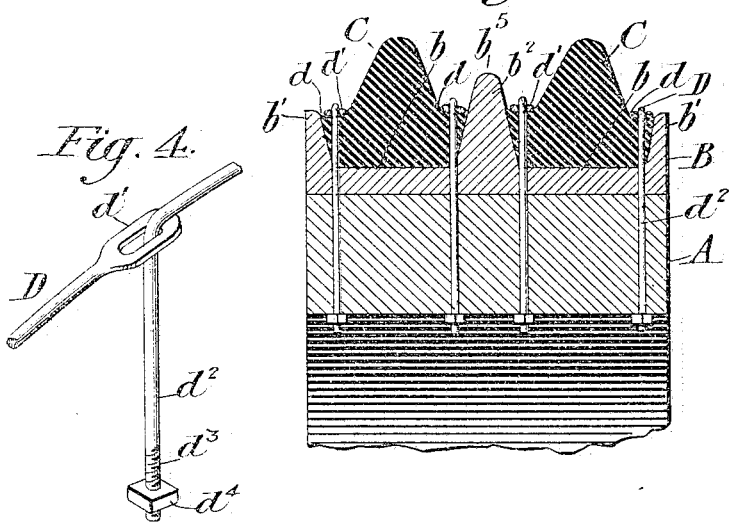
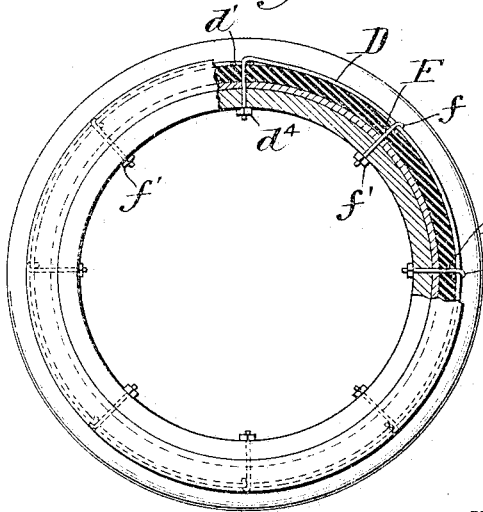
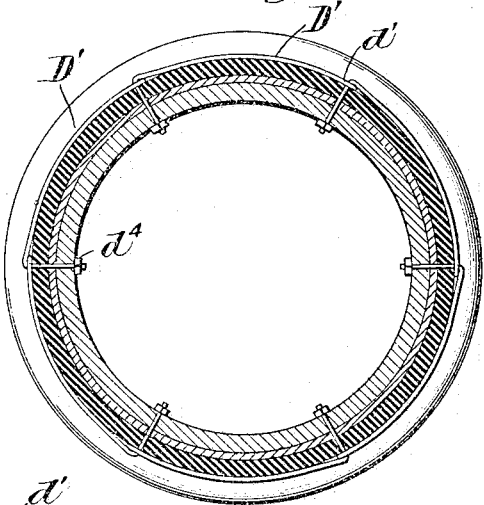
Witnesses:
O. W. Edelin
A. Harveycutter
Inventor:
Alexander Turkington
by Robt. P. Heine,
atty.

No. 766,297. Patented August 2, 1904.

UNITED STATES PATENT OFFICE.

ALEXANDER TURKINGTON, OF LAFAYETTE, INDIANA.

WHEEL FOR VEHICLES.

SPECIFICATION forming part of Letters Patent No. 766,297, dated August 2, 1904.

Application filed December 3, 1903. Serial No. 183,585. (No model.)

*To all whom it may concern:*

Be it known that I, ALEXANDER TURKINGTON, a citizen of the United States, residing at Lafayette, in the county of Tippecanoe and State of Indiana, have invented certain new and useful Improvements in Wheels for Vehicles, of which the following is a specification.

The invention to be hereinafter described relates to wheels for vehicles, and more particularly the means for securing tires in place on the felly of the wheel, and is designed as an improvement on my prior patent, No. 741,193, dated October 13, 1903.

In my prior patent referred to I show and describe a wheel for motor-vehicles which in addition to the ordinary tread-surface furnished by the yielding tire has an auxiliary or supplemental tread-surface furnished by a projecting wall of the tire-support, such auxiliary or supplemental tread-surface coming into action only under unusual load or road conditions or when the rubber tire has become worn or detached from its support. As one means of securing the tire to its support I have shown in said patent two wires embedded in the material of the tire, the ends of each wire being joined in a suitable manner. In practice I have found much difficulty in properly adjusting a tire to its support where the holding-wire is embedded in the material of the tire, and when on the road a breakage of said embedded wires cannot be readily repaired, as even if a new wire is at hand it is necessary to thread this wire in the tire through the hole previously occupied by the broken wire, an operation requiring skill and time.

In some cases where the holding-wires are arranged on the exterior of the tire the objectionable loss of time and skill required in threading a new one through the tire when the one previously in use becomes broken has been overcome to some extent; but in such cases other objections have arisen, such as the danger of the entire holding-wire and tire flying off the wheel upon breakage of the wire, which, if it occurs when the vehicle is under high speed, will effectually injure if not destroy the felly where it is formed without the auxiliary or supplemental tread-surface. Also the complicated fastenings and adjuncts for these wires render them practically objectionable.

With the above general defects in view the object of my present invention is to provide an exterior holding-wire for a tire that will be simple in construction, readily replaced by a new one with little or no skill, that can be tightened about the tire in an efficient manner by simple adjusting means, and that will not fly off or release the tire should any part of the wire become broken.

Having in view the above generally-stated objects, my invention consists of the parts and combinations hereinafter more fully described, and definitely pointed out in the claims.

In the drawings, Figure 1 is a cross-section of a vehicle-wheel provided with a tire and embodying my invention. Fig. 2 is a side view, partly in section, showing the manner of applying the exterior holding-wires to the exterior of the tire. Fig. 3 is a vertical section in the plane of the wheel, showing a modified arrangement of the exterior holding-wires; and Figs. 4 and 5 are details showing the manner of connecting the exterior wires by passing the end of a wire through a flattened eye.

In the form of invention illustrated by Fig. 1 I have shown a vehicle-wheel in which a plurality of tires is employed and wherein A represents a part of the wheel, such as the felly, which may be of any usual construction and to which is secured in any appropriate or approved manner the tire-support B. As described in my prior patent, No. 741,193, the tire-support B comprises a metallic rim-like structure provided with a plurality of channel-ways or tire-supporting grooves $b\ b$, each for the reception of a suitable tire C. The outer walls $b'\ b'$ of the channel-ways or grooves $b\ b$ extend part way of the height of the tires C C, and these channel-ways or grooves are separated by the intermediate wall $b^2$, the top $b^5$ of which extends considerably higher than the tops of the side walls, all as explained in my previous patent referred to, to thereby present a supplemental or auxiliary tread-surface for undue wear or breakage of one of the tires or unusual conditions of roadway. Each of the tires C C has on each side thereof, as at $d$, a groove adapted to receive the exterior holding-wires D. These holding-wires D, as will be seen from Fig. 1, extend circumferentially of the tire, and each is provided at one end with a broad flattened eye $d'$, through which the other end of the wire is adapted to pass, as shown in Fig. 4. I have found in practice that it is preferable to form the eye $d'$ of a broad flattened character, as shown in Figs. 4 and 5, in order that the strain placed upon this eye when the exterior holding-wire is drawn forcibly about the tire will not cut deeply into the substance of the tire, but will afford a broad flat bearing and act to some extent as a washer, thus preventing the holding-wire cutting its way into the tire.

In the form of invention shown by Figs. 2 and 4 the holding-wire D is passed circumferentially entirely around the exterior of the tire C in the groove $d$, the end $d^2$ of the holding-wire in this form being passed through the eye $d'$, then through the tire-support B and the felly A, on the inner side of which it is provided with a suitable drawing or tightening device, shown in the present instance as a screw-thread $d^3$ on the end $d^2$ of the exterior holding-wire, and a nut $d^4$, as will be clear from Figs. 2 and 4.

Should the exterior holding-wire in the form of invention described become broken while on the road, it is only necessary to loosen the nut $d^4$, take out the old holding-wire D, and substitute therefor another, which can be expeditiously and readily applied by any one and the application of which does not call for the exercise of any mechanical skill.

In the form of invention where the wire passes entirely around the tire, as shown in Fig. 2, I have applied holding-bolts F at intervals in the circumference of the tire, the said holding-bolts having eyes $f$, which engage over the holding-wire on the exterior of the tire, the opposite ends of said bolts passing through the tire-support and felly, where they receive the tightening-nuts $f'$. The object of these holding-bolts is to prevent the holding-wire from becoming entirely detached from the wheel should it become broken at any part. Thus should the exterior wire not be provided with these holding-bolts and become broken there is liability that the entire holding-wire would fly from the tire and endanger the displacement of the tire from its support; but by the use of the holding-bolts F if the exterior wire becomes broken at any point such holding-bolts will retain the exterior wire in place upon the tire, and, in fact, a vehicle even with the holding-wire broken would run for quite a time by reason of the holding-bolts maintaining the exterior wire in place on the tire.

In Figs. 3 and 5 I have shown another form of the invention wherein the exterior holding-wires do not run continuously the entire circumference of the wheel, but wherein they are made in sections. In this form of invention each of the wires D' is provided with the same character of broadened eye $d'$ at one end, and the opposite end thereof is provided with the same character of screw-thread $d^3$ for a tightening-nut $d^4$ as in Figs. 1 and 4; but instead of the wire passing around the entire circumference of the tire each section D' of the wire in this form passes around only a portion of the tire, and the screw-threaded end of each section passes through the flattened eye of the next succeeding section and then through the tire-support and felly, on the inside of which it is provided with a tightening-nut $d^4$ or other suitable tightening means. In this form of the exterior holding-wire the through-bolts F are not necessary, since if any one of the sections D' should become broken its connection with the wheel by means of the screw-thread and nut will prevent its becoming entirely detached from the other sections, which remain intact, so that there is little or no danger of the tire becoming free from the support.

It will be seen from the invention as I have described it that the holding-wire is exterior of the tire and that its application or renewal at any time is exceedingly simple and does not require mechanical skill. Moreover, the simple form of attachment of the exterior wire by means of passing the threaded end of the wire through the broad flattened eye enables the exterior wire to be tightened around the top at any time by the use of tools always readily at hand, and to secure such tightening of the exterior wire only the manipulation of a single nut in the construction shown by Figs. 1, 2, and 4 is necessary.

I have found in practice that the wear and tear on tires, especially in runs across country roads, is very great and that renewal of tires is one of the chief expenses incident to the automobile travel. By the use of my auxiliary tread-surface, as stated in my previous patent, this rapid wear is largely reduced, and by the employment of the particular exterior holding-wire, as hereinbefore described, ready replacement of a tire may be made by any one not a skilled mechanic.

Having thus described my invention, what I claim as new, and desire to secure by Letters Patent, is—

1. The combination, of a felly, a tire-support mounted thereon, a tire sustained by said support, exterior wires arranged at each side of the tire for maintaining the tire on its support, said wires being arranged circumferentially of the tire and having a flattened eye at one end to bear upon the exterior of the tire and through which the other end of one of the wires is adapted to pass, and means applied to said other end of the wire for drawing the same through the eye and about the tire.

2. The combination of a felly, a tire-support mounted thereon, a tire sustained by said support, exterior wires arranged at each side of the tire for maintaining the tire on its support, said wires being arranged circumferentially of the tire and having a flattened eye at one end to bear upon the exterior of the tire and through which the other end of one of the wires is adapted to pass, means applied to said other end of the wire for drawing the same through the eye and about the tire, and screw-bolts having hooked ends to engage the wire exterior of the tire, said screw-bolts being passed through the tire and support.

3. The combination of a felly, a tire-support mounted thereon, a tire sustained by said support, exterior holding-wires for maintaining the tire upon its support, said wires being arranged circumferentially of the tire and having a flattened eye at one end and a screw-thread on the other end, the screw-threaded end of one wire being passed through the flattened eye of the next adjacent wire and through the tire-support, and a nut for engaging the threaded end of each wire for drawing the wire through the eye of the next adjacent wire and tightening the series of wires about the exterior of the tire.

4. In a vehicle-wheel, the combination of a felly, a tire-support mounted thereon and provided with projecting walls, a tire carried by the support between said walls, one of said walls being extended beyond the remaining walls to form a supplemental tread-surface, and wires arranged exterior of the tire for holding the tire on its support, said wires having an eye in one end through which the opposite end of a wire passes, and tightening means applied to said last-named end.

In testimony whereof I affix my signature in presence of two witnesses.

ALEXANDER TURKINGTON.

Witnesses:
WILLIAM C. MITCHELL,
J. W. McCREA.